United States Patent
He et al.

(10) Patent No.: US 7,917,786 B2
(45) Date of Patent: Mar. 29, 2011

(54) VOLTAGE REGULATING CIRCUIT FOR MOTHERBOARD

(75) Inventors: Feng-Long He, Shenzhen (CN); Hua Zou, Shenzhen (CN); Wei Wang, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 655 days.

(21) Appl. No.: 11/965,743

(22) Filed: Dec. 28, 2007

(65) Prior Publication Data
US 2009/0158059 A1 Jun. 18, 2009

(30) Foreign Application Priority Data
Dec. 14, 2007 (CN) .......................... 2007 1 0203097

(51) Int. Cl.
*G06F 1/32* (2006.01)
*G05F 1/10* (2006.01)

(52) U.S. Cl. ......... 713/320; 713/300; 327/544; 327/581

(58) Field of Classification Search .................. 713/300, 713/320; 326/68, 102; 327/544, 581
See application file for complete search history.

(56) References Cited

U.S. PATENT DOCUMENTS

| | | | | |
|---|---|---|---|---|
| 5,815,455 | A * | 9/1998 | Braithwaite et al. | 365/229 |
| 6,775,784 | B1 * | 8/2004 | Park | 713/320 |
| 7,205,808 | B2 * | 4/2007 | You et al. | 327/198 |
| 2004/0193927 | A1 * | 9/2004 | Volk | 713/300 |
| 2005/0283625 | A1 * | 12/2005 | Rotem et al. | 713/300 |
| 2006/0265614 | A1 * | 11/2006 | Nguyen | 713/300 |

* cited by examiner

*Primary Examiner* — Mark Rinehart
*Assistant Examiner* — Nimesh G Patel
(74) *Attorney, Agent, or Firm* — Frank R. Niranjan

(57) ABSTRACT

An exemplary voltage regulating circuit for a motherboard includes a selecting switch and a first switch module, the selecting switch comprising a first input terminal arranged to receive a standby power provided by a power supply, a first control terminal arranged to receive a state signal from the motherboard via a first switch module controlled by a power good signal generated by the power supply, and an output terminal, wherein, when the motherboard is turned off, the state signal is at a high level and the first switch module is turned on by the power good signal for turning off the selecting switch to stop outputting the standby power.

1 Claim, 1 Drawing Sheet

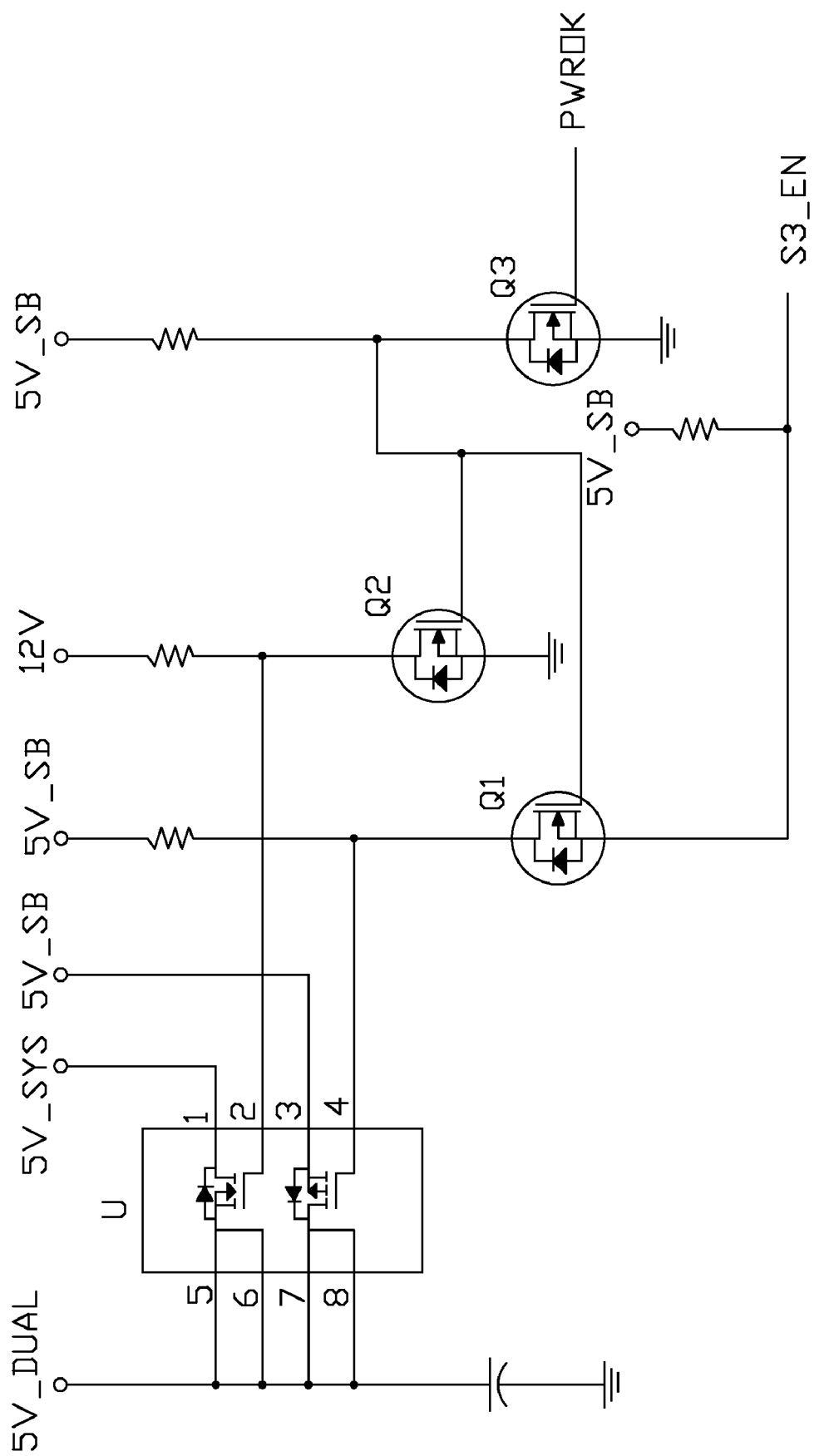

VOLTAGE REGULATING CIRCUIT FOR MOTHERBOARD

BACKGROUND

1. Field of the Invention

The present invention relates to voltage regulating circuits, and particularly to a voltage regulating circuit for a motherboard.

2. Description of related art

A typical microprocessor-cored computer system, such as a personal computer or a workstation computer, is turned on and off by a switch device that mechanically connects/disconnects a power supply of the computer system to/from an external voltage source, such as AC 110V. The power supply is connected to the external voltage source and transforms the external voltage into a predetermined DC level, such as +3.3V, +/−5V and +/−12V, and the computer system is turned on to perform various programs and functions.

As known by a person skilled with computers, the power supply mainly includes ATX power supply and BTX power supply. A motherboard of a computer can be coupled to the ATX power supply via a 20-pin ATX power connector and two 4-pin ATX power connectors. The ATX power supply provides +3.3V, +/−5V, +/−12V, +5V_SB (stand by), PS_ON (power supply on) signal, and PWR_DOOD (power good) signal. When the ATX power supply is turned on, the PS_ON signal is at a low level, and the PWR_GOOD signal is at a high level but there is a delay of 100-500 ms for the other voltages. When the ATX power supply is turned off or put on stand by, the PS_ON signal is at a high level, and +3.3V, +/−5V, +/−12V are turned off, but the +5V_SB is still provided.

SUMMARY

An exemplary voltage regulating circuit for a motherboard comprises a selecting switch and a first switch module, the selecting switch comprising a first input terminal arranged to receive a standby power provided by a power supply, a first control terminal arranged to receive a state signal from the motherboard via a first switch module controlled by a power good signal generated by the power supply, and an output terminal, wherein, when the motherboard is turned off, the state signal is at a high level and the first switch module is turned on by the power good signal for turning off the selecting switch to stop outputting the standby power.

Other advantages and novel features of the present invention will become more apparent from the following detailed description of preferred embodiment when taken in conjunction with the accompanying drawing, in which:

BRIEF DESCRIPTION OF THE DRAWINGS

The drawing is a circuit diagram of a voltage regulating circuit for a motherboard in accordance with an embodiment of the present invention.

DETAILED DESCRIPTION

Referring to the drawing, a voltage regulating circuit for a motherboard in accordance with an embodiment of the present invention includes a selecting switch U, a first switch module, and a second switch module. The selecting switch U includes a first input terminal 3 arranged to receive a standby power 5V_SB provided by the power supply, a first control terminal 4 arranged to receive the standby power 5V_SB, a second input terminal 1 arranged to receive a system power 5V_SYS provided by a power supply, a second control terminal 2 arranged to receive a starting voltage 12V, and four output terminals 5~8 to form an voltage output terminal 5V_DUAL.

The selecting switch U includes an NMOS transistor and a PMOS transistor. The source of the PMOS transistor is the first input terminal 3 of the selecting switch U, the gate of the PMOS transistor is the first control terminal 4 of the selecting switch U, the drain of the NMOS transistor is the second input terminal 1 of the selecting switch U, the gate of the NMOS transistor is the second control terminal 2 of the selecting switch U, the drain of the PMOS transistor is connected to the source of the NMOS transistor as the output terminals 5~8 of the selecting switch U.

The first switch includes an NPN transistor Q1. The drain of the NPN transistor Q1 is arranged to receive the starting voltage 12V and connected to the gate of the PMOS transistor of the selecting switch U. The source of the NPN transistor Q1 is arranged to receive a state signal S3_EN from the motherboard. The gate of the NPN transistor Q1 is arranged to receive the standby power 5V_SB.

The second switch module includes two NMOS transistors Q2 and Q3. The drain of the NMOS transistor Q2 is arranged to receive the starting voltage 12V and is connected to the gate of the NMOS transistor of the selecting switch U, and the gate of the NMOS transistor Q2 is connected to the drain of the NMOS transistor Q3. The drain of the NMOS transistor Q3 is arranged to receive the standby power 5V_SB and is connected to the gate of the NMOS transistor Q1, and the gate of the NMOS transistor Q3 is arranged to receive a power good signal PWROK generated by the power supply. The sources of the NMOS transistors Q2 and Q3 are grounded.

When the motherboard is turned on, the power good signal PWROK is at a high level, and the state signal is at a high level too. Therefore, the NMOS transistor Q3 is turned on to turn off the NMOS transistors Q1 and Q2. The NMOS transistor of the selecting switch U is turned on and the PMOS transistor of the selecting switch U is turned off. The voltage output terminal 5V_DUAL outputs the system power 5V_SYS.

When the motherboard is in a standby state, the power good signal PWROK is at a low level, and the state signal is at a low level too. Therefore, the NMOS transistor Q3 is turned off to turn on the NMOS transistors Q1 and Q2. The NMOS transistor of the selecting switch U is turned off and the PMOS transistor of the selecting switch U is turned on The voltage output terminal 5V_DUAL outputs the standby power 5V_SB.

When the motherboard is turned off, the power good signal PWROK is at a low level, but the state signal is at a high level. Therefore, the NMOS transistor Q3 is turned off to turn on the NMOS transistors Q1 and Q2. The NMOS transistor of the selecting switch U is turned off and the PMOS transistor of the selecting switch U is turned off, and the voltage output terminal 5V_DUAL stops outputting.

The foregoing description of the exemplary embodiments of the invention has been presented only for the purposes of illustration and description and is not intended to be exhaustive or to limit the invention to the precise forms disclosed. Many modifications and variations are possible in light of the above teaching. The embodiments were chosen and described in order to explain the principles of the invention and their practical application so as to enable others skilled in the art to utilize the invention and various embodiments and with various modifications as are suited to the particular use contemplated. Alternative embodiments will become apparent to those skilled in the art to which the present invention pertains without departing from its spirit and scope. Accordingly, the scope of the present invention is defined by the appended claims rather than the foregoing description and the exemplary embodiments described therein.

What is claimed is:

1. A voltage regulating circuit for a motherboard comprising a selecting switch and a switch module, the selecting switch comprising a first NMOS transistor and a PMOS transistor, the switch module comprising second to fourth NMOS transistors;

wherein the source of the PMOS transistor is arranged to receive a standby power provided by a power supply, the gate of the PMOS transistor is connected to the standby power and the drain of the second NMOS transistor, the drain of the first NMOS transistor is arranged to receive a system power, the gate of the first NMOS transistor is arranged to receive a starting voltage and connected to the drain of the third NMOS transistor, the drain of the PMOS transistor is connected to the source of the first NMOS transistor as an output terminal of the selecting switch;

wherein the gate of the second NMOS transistor is connected to the gate of the third NMOS transistor and the drain of the fourth NMOS transistor and the standby power, the source of the second NMOS transistor is connected to the standby power and arranged to receive a state signal from the motherboard, the gate of the fourth NMOS transistor is arranged to receive a power good signal generated by the power supply, the sources of the third and fourth NMOS transistors are grounded;

wherein when the motherboard is turned off, the state signal is at a high level, the power good signal is at a low level; when the motherboard is turned on, the state signal is at a high level, the power good signal is at a high level; when the motherboard is in a standby state, the state signal is at a low level, the power good signal is at a low level.

* * * * *